(12) United States Patent
Takeda et al.

(10) Patent No.: US 6,857,122 B1
(45) Date of Patent: Feb. 15, 2005

(54) MULTI-THREAD PROCESSING APPARATUS, PROCESSING METHOD AND RECORD MEDIUM HAVING MULTI-THREAD PROCESSING PROGRAM STORED THEREON

(75) Inventors: Shinichi Takeda, Toyama (JP); Takao Yagi, Toyama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/468,490

(22) Filed: Dec. 20, 1999

(30) Foreign Application Priority Data

Aug. 12, 1999 (JP) .......................................... 11-228308

(51) Int. Cl.[7] ................................................. G06F 9/46
(52) U.S. Cl. ........................ 718/107; 718/100; 718/106
(58) Field of Search ................................. 709/100–108, 709/315; 714/2; 379/88.13; 718/1–108

(56) References Cited

U.S. PATENT DOCUMENTS

| | | | | | |
|---|---|---|---|---|---|
| 5,179,702 | A | * | 1/1993 | Spix et al. | 709/102 |
| 5,659,701 | A | * | 8/1997 | Amit et al. | 709/317 |
| 6,081,906 | A | * | 6/2000 | Nishizawa et al. | 714/2 |
| 6,463,480 | B2 | * | 10/2002 | Kikuchi et al. | 709/315 |
| 6,493,433 | B2 | * | 12/2002 | Clabaugh et al. | 379/88.13 |
| 6,493,740 | B1 | * | 12/2002 | Lomax | 709/107 |

* cited by examiner

*Primary Examiner*—Meng-Al T. An
*Assistant Examiner*—Kenneth Tang
(74) *Attorney, Agent, or Firm*—Greer, Burns & Crain, Ltd.

(57) ABSTRACT

A single thread program of a different process is called for execution from a multi-thread program capable of executing a plurality of threads in parallel. When first calling the single thread program from one specific thread of the multi-thread program and running the same, the sole call only thread for calling the single thread program is generated for use.

8 Claims, 15 Drawing Sheets

FIG. 6

| LIBRARY NAME | METHOD NAME | METHOD PROTOTYPE | MODE |
|---|---|---|---|
| fxxxxx1.dll | function1 | icschi | SINGLE |
| fxxxxx1.dll | function2 | ipppp | MULTI |
| fxxxxx2.dll | function1 | pcdp | SINGLE |
| fxxxxx2.dll | function1 | iv [B | SINGLE |

FIG. 7A

| | LIBRARY NAME 52 | METHOD NAME 54 | METHOD PROTOTYPE 56 | RESETTING VALUE /ARGUMENT (ARRAY) 60 | CALLER THREAD ID 62 |
|---|---|---|---|---|---|
| 28-1 | fxxxxx1.dll | function1 | icschi | object [] | 0xAAAAAAAA |
| 28-2 | fxxxxx2.dll | function1 | pcdp | object [] | 0xBBBBBBBB |
| 28-3 | fxxxxx2.dll | function1 | iv [B | object [] | 0xCCCCCCCC |

| LIBRARY NAME 52 | METHOD NAME 54 | METHOD PROTOTYPE 56 | RESETTING VALUE /ARGUMENT (ARRAY) 60 | CALLER THREAD ID 62 |
|---|---|---|---|---|

SYNCHRONOUS EVENT 28

FIG. 8A

| | LIBRARY NAME 52 | METHOD NAME 54 | METHOD PROTOTYPE 56 | RESETTING VALUE /ARGUMENT (ARRAY) 60 | CALLER THREAD ID 62 | GROUP 64 | PRIORITY 66 |
|---|---|---|---|---|---|---|---|
| 28-1 | fxxxxxx1.dll | function1 | icschi | object [ ] | 0xAAAAAAAA | | |
| 28-2 | fxxxxxx2.dll | function1 | pcdp | object [ ] | 0xBBBBBBBB | UI | +1 |
| 28-3 | fxxxxxx1.dll | function2 | ipppp | object [ ] | 0xCCCCCCCC | | |
| 28-4 | fxxxxxx2.dll | function2 | V [B | object [ ] | 0xDDDDDDDD | UI | −1 |

FIG. 8B

| | LIBRARY NAME 52 | METHOD NAME 54 | METHOD PROTOTYPE 56 | RESETTING VALUE /ARGUMENT (ARRAY) 60 | CALLER THREAD ID 62 | GROUP 64 | PRIORITY 66 |
|---|---|---|---|---|---|---|---|
| 28-1 | fxxxxxx1.dll | function1 | icschi | object [ ] | 0xAAAAAAAA | | |
| 28-4 | fxxxxxx2.dll | function2 | V [B | object [ ] | 0xDDDDDDDD | UI | +1 |
| 28-3 | fxxxxxx1.dll | function2 | ipppp | object [ ] | 0xCCCCCCCC | | |
| 28-2 | fxxxxxx2.dll | function1 | pcdp | object [ ] | 0xBBBBBBBB | UI | −1 |

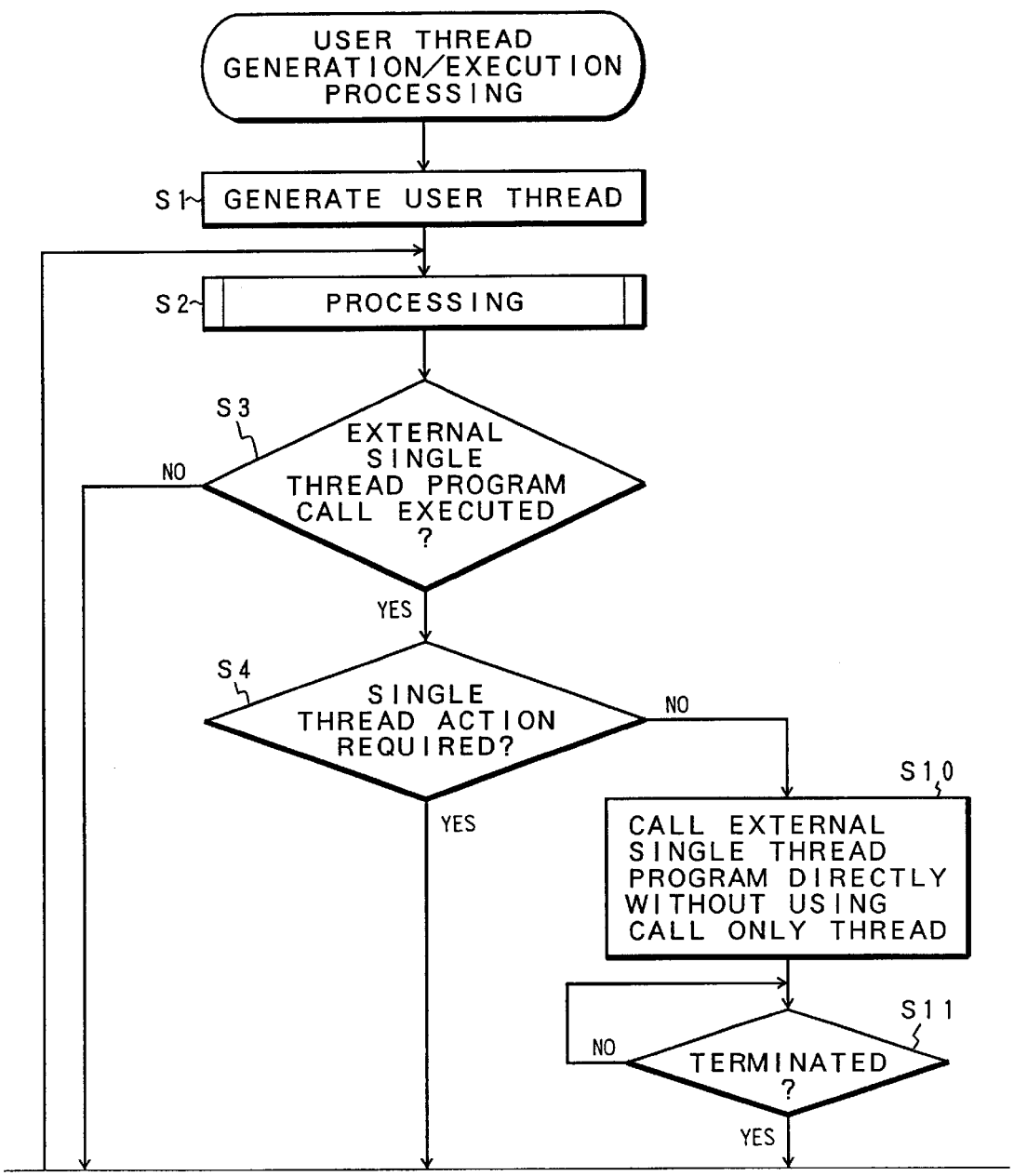

MULTI-THREAD PROCESSING APPARATUS, PROCESSING METHOD AND RECORD MEDIUM HAVING MULTI-THREAD PROCESSING PROGRAM STORED THEREON

BACKGROUND OF THE INVENTION

1. Field of the Invention

The present invention relates generally to a multi-thread processing apparatus designed to call single thread programs from a multi-thread program executing a plurality of threads in parallel and to run the single thread programs called, and a multi-thread processing method as well as a computer readable record medium having thereon stored a multi-thread processing program. More particularly, it relates to a multi-thread processing apparatus ensuring a call of the same single thread program by a plurality of threads, and a multi-thread processing method as well as a computer readable record medium on which a multi-thread processing program is stored.

2. Description of the Related Arts

In a program operable in multi threads such as Hot. Java, a so-called multi-thread program, in cases where faster processing of a certain thread is achieved by using a single thread program such as the existing COBOL which is present in the form of a dynamic library, the existing single thread program has hitherto been called for operation from the multi-thread program.

FIG. 1 illustrates the case where the multi-thread program on a server calls the existing COBOL program by use of a remote method invocation (RMI) for the run thereof. When accepting a method call (RMI call) from clients 120-1 and 120-2, an RMI server application 100 acting as the multi-thread program generates a root thread 114 as a main thread and then generates threads 116-1 and 116-2 and runs the same. In this manner, the PMI server application 100 generates a plurality of threads in response to the method call and executes them in parallel, with the result that it acts inevitably as a multi-thread program. In such a case, the user is not able to control the generation of the threads 116-1 and 116-2. For this reason, the threads 116-1 and 116-2 arbitrarily call and run a single thread program 118 written in COBOL program or the like as the existing resources.

In the case of calling and running the single thread programs from the multi-thread program, however, the following problems will take place. First, the single thread program 118 may sometimes use such resources as static variables on the assumption that one process consists of one thread. If such a single thread program 118 is operated in the multi thread allowing accesses of a plurality of threads, the accesses to the resources such as the static variables may compete, resulting in a possible abnormal action of the single thread program.

FIG. 2 illustrates a problem which will occur when an access to the static variable of the single thread program has been made by functions of the threads 116-1 and 116-2 of FIG. 1. The threads 116-1 and 116-2 of FIG. 1 are executed in parallel but in asynchronism to call the single thread program 118 separately. At that time, the functions Awrap f1 (args)@ and Awrap f2 (args)@ of the threads 116-1 and 116-2, respectively, make accesses to the static variable Aptr@ of the single thread program 118. For example, a call by the thread 116-1 allows a memory area 138 for the static variable ptr to be allocated to a data area 136 within f(1) of a thread corresponding area 134-1 of a process area 132 allocated in a main storage 130 of FIG. 2. An access to the area 138 allocated to the static variable ptr is then made and the area 138 is deallocated previous to the resetting of f10. Similarly, a call by the thread 116-2 also allows the allocation of the memory area 138 for the static variable ptr within f20 of a thread corresponding area 134-2, after which an access is made to the area 138 allocated to the static variable ptr, the area 138 being deallocated prior to the resetting of f20. Due to the asynchronism in execution of the single thread program 118 by the threads 116-1 and 116-2, the accesses of the functions f10 and f20 to the static variable ptr are also executed in parallel but in asynchronism. For this reason, immediately after the allocation of the memory area 138 to the static variable ptr by the function f10 of the thread 116-1, there will again occur the allocation of the memory area 138 to the static variable ptr by the function f20 of the thread 116-2. At that time, as a result of the access to the area 138 for the static variable ptr by the function f10 of the thread 116-1, there will be no area intended by the allocation by the function f20 of the thread 116-2, resulting easily in an abnormality such as memory overrun, leading to an abnormal end of the program. In case of execution of the single thread program 118 by the plurality of threads 116-1 and 116-2, the single thread program 118 may not necessarily be executed in the order of call by the threads 116-1 and 116-2, so that the order of actions will not be assured. Thus, the result of execution may possibly depart from the intention of the user.

FIG. 3 illustrates the case where the single thread program as the existing resources is called from applets executed in parallel on the browser. When applets 146-1 and 146-2 of a WWW server 140 are downloaded by the threads 116-1 and 116-2 generated on a browser 144 of a client 142, the plurality of applets 146-1 and 146-2 are executed in parallel on the browser. In this case as well, the user is not able to control the generation of the applets 146-1 and 146-2. For this reason, the applets 146-1 and 146-2 arbitrarily call and run the single thread program 118 written in COBOL program or the like as the existing resources. As a result, any competitive accesses may arise to the resources such as the static variables shown in FIG. 2, so that the single thread program may operate in an abnormal manner.

In order to solve such a problem which may occur when the existing single thread program is called for the running from the multi-thread program, it may be envisaged that a different process is generated upon the call of the single thread program from the multi-thread program so that the single thread program can be run therein. However, the generation of the new process may often necessitate the generation of a data area, with a greater load resulting in a poor performance. It may also be conceivable that the existing single thread program is remade into a multi-thread program. However, remaking the existing single thread program into the multi-thread program will need a number of process steps, resulting in a lowered efficiency of development.

SUMMARY OF THE INVENTION

According to the present invention there is provided a multi-thread processing apparatus ensuring the call of single thread programs of different processes by a multi-thread program in order to achieve an effective utilization of existing resources.

The present invention provides a multi-thread processing apparatus for calling a single thread program from a multi-thread program capable of executing a plurality of threads in parallel and for running the single thread program called, the apparatus being characterized by the provision of a sole call only thread for calling the single thread program, the call only thread being generated when first calling the single thread program from one specific thread of the multi-thread program and running the single thread program called. By virtue of the provision of a structure calling the single thread programs constantly from the same call only thread generated in the multi-thread program in this manner, any competitions can be prevented of accesses from the plurality of threads to the resources even though the single thread programs have used the resources such as static variables. Furthermore, due to no necessity to newly generate different processes upon the call of the single thread programs from the multi-thread program, an improved execution performance is achieved. In addition, due to no need to remake the single thread program into the multi-thread program upon the call of the single thread programs from the multi-thread program, an improved development efficiency is attained.

The call only thread calls the single thread programs in the order of call from the plurality of threads generated by the multi-thread programs. Thus, the single thread programs are executed in the order of call from the plurality of threads within the multi-thread program, to attain the results of execution intended by the user. The call only thread is provided with an event queue having a first-in first-out (FIFO) configuration, for storing synchronous events entered therein as requests for call from the threads of the multi-thread program, the call only thread fetching the synchronous events in order from the event queue to run the single thread programs. The synchronous event entered into an event queue of the call only thread is in the form of a record in which at least a method name and a caller thread ID are stored as information for specifying a single thread program to be called. Other than these, the record may store a library name, a method prototype, and a resetting value/argument.

The call only thread belongs to a group of a most significant thread (root thread or main thread) generated by the multi-thread program, to thereby terminate in synchronism with the termination of the most significant thread.

The sole call only thread for calling the single thread programs generated in the present invention can exist as long as the process is effective once generated, although the threads must correctly terminate the call only thread upon the termination of the process. Therefore, the call only thread is caused to belong to the same thread group as one to which the most significant root thread (main thread) belongs, to thereby ensure that the call only thread terminates upon the termination of the root thread (main thread). The user thread judges whether the call only thread is needed or not when calling the single thread program, and, if needed, it makes a call by use of the call only thread, but if not, makes a direct call of the single thread program. Thus, the user thread judges whether the call only thread is needed or not, on the basis of a designation by the user or of an environment definition table in which the presence or absence of need for the call only thread is described in a manner corresponding to the method prototype or method of the single method program. This allows for the fact that when the multi-thread program calls a single thread program, the single thread program may not cause any problems by chance. In such a case, use of the call only thread would result in a lowered execution performance because of its complicated processing. Thus, in the case of the single thread program posing no problems, the single thread program is directly called with the call only thread bypassed so that the execution performances are improved.

The present invention further provides a multi-thread processing method for calling a single thread program from a multi-thread program capable of executing a plurality of threads in parallel and for running the single thread program called, the method comprising the steps of generating a sole call only thread for calling the single thread program when first calling the single thread program from one specific thread of the multi-thread program and running the single thread program called; and after generation, calling.the single thread program by use of the call only thread.

The present invention further provides a computer readable record medium on which is stored a multi-thread processing program for calling a single thread from a multi-thread program capable of executing a plurality of threads in parallel and for executing the single thread called, wherein the multi-thread processing program stores therein a sole call only thread for calling the single thread program, the call only thread being generated when first calling the single thread program from one specific thread of the multi-thread program and running the single thread program called.

The above and other objects, aspects, features and advantages of the present invention will become more apparent from the following detailed description with reference to the accompanying drawings.

BRIEF DESCRIPTION OF THE DRAWINGS

FIG. 6 is an explanatory diagram of an environment definition table for use in the judgement of the presence or absence of need for the call only thread in the server application of FIG. 4;

FIGS. 7A and 7B are explanatory diagrams, respectively, of an identification information table for use when the thread of FIG. 4 calls the single thread program, and of a synchronous event placed into the call only thread;

FIGS. 8A and 8B are explanatory diagrams of the synchronous events having priorities, entered into an event queue of the calling thread;

FIGS. 10A and 10B are detailed flowcharts of user thread generation/execution processing in FIG. 9;

DETAILED DESCRIPTION OF THE PREFERRED EMBODIMENTS

Figure 4:
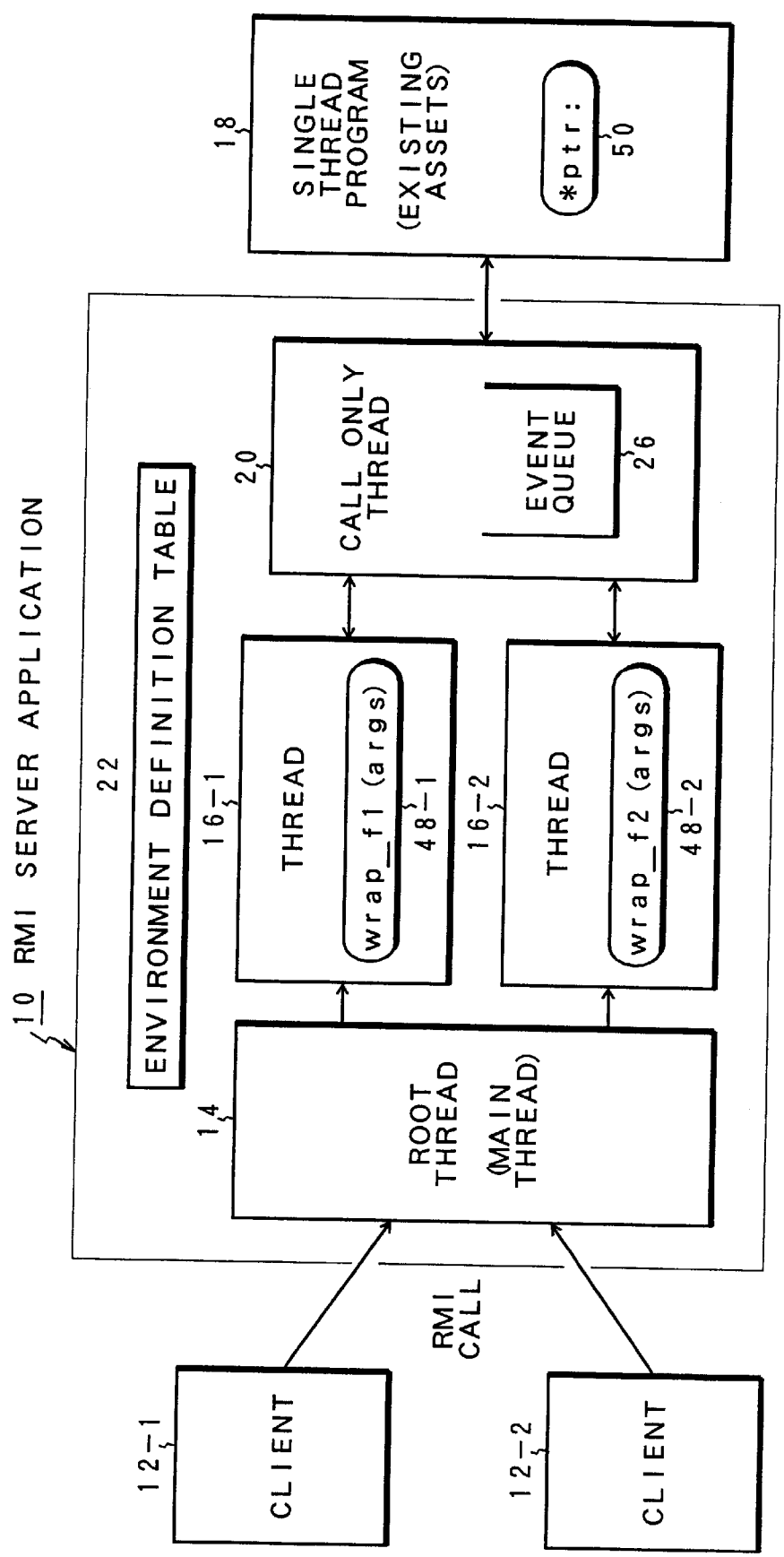
FIG. 4 is a block diagram of a first embodiment of the present invention in which the multi-thread program of the server application is executed by use of the remote method invocation (RMI)

FIG. 4 illustrates an embodiment of a multi-thread processing apparatus in accordance with the present invention, in the case of using by way of example a remote method invocation (RMI) to execute a multi-thread program in the form of a server application. The RMI server application 10 functioning as the multi-thread program forms a root thread 14 acting as a main thread upon the invocation of a program to accept RMI calls which are method calls from clients 12-1 and 12-2. Every time accepting the RMI calls from the clients 12-1 and 12-2, the root thread 14 generates threads 16-1 and 16-2, for example, which are executed in parallel for the multi-thread action. The threads 16-1 and 16-2 sometimes utilize a single thread program 18 in the form of a dynamic library being present as an existing resource. The single thread program 18 as existing assets is a data base or the like written in a COBOL program for example and is present as a process separate from the process of the multi-thread program implemented by the RMI server application 10. In cases where the single thread program 18 is called by means of the threads 16-1 and 16-2 in the present invention, a call only thread 20 is generated in principle. When the two threads 16-1 and 16-2 are executed in parallel herein, the call only thread 20 is generated by the thread first calling the single thread program 18 in conformity with the sequence of execution of the program. The call only thread 20 generated by the thread 16-1 or 16-2 incorporates therein an event queue 26 with an FIFO configuration. In case the threads 16-1 and 16-2 attempt to call the single thread program 18, each thread generates a synchronous event and inserts it into the event queue 26 of the call only thread 20. The synchronous event generated by the threads 16-1 and 16-2 for the call of the single thread program 18 comprises:

I. information such as function names and arguments necessary for the execution of the single thread program; and II. an event including identification information on a method (single thread program) to be acted upon.

Due to its FIFO configuration, the event queue 26 of the call only thread 20 fetches the topmost one of the synchronous events being queued in the event queue 26 and executes the single thread program 18 on the basis of the information contained in the thus fetched synchronous event. After the completion of execution of the single thread program 18, the function returns to the call only thread 20. In response to this return of the function, the call only thread 20 posts the thread 16-1 or 16-2 which has entered the synchronous event on the completion of execution of the single thread program 18. In the sequence of call of the single thread program 18 the threads 16-1 and 16-2 insert the synchronous events into the event queue 26 of the call only thread 20 generated in this manner and execute the single thread program 18 in conformity with the order of entry, whereby accesses to variables of the single thread program 18 can not be subjected any competitions. Even though functions 48-1 and 48-2 utilize a static variable 50 of the single thread program 18 when the threads 16-1 and 16-2 insert the synchronous events for the call of the single thread program into the call only thread 20 in the mentioned order, the call only thread 20 executes the single thread program 18 based on the synchronous event fed from the thread 16-2 after the completion of execution of the single thread program 18 based on the synchronous event from the thread 16-1. As a result of this, only one thread is permitted to have an access to the static variable 50 at one time even though the plurality of threads 16-1, 16-2 are calling the single thread program 18, thereby obviating the problem of competition for resources.

Figure 1:
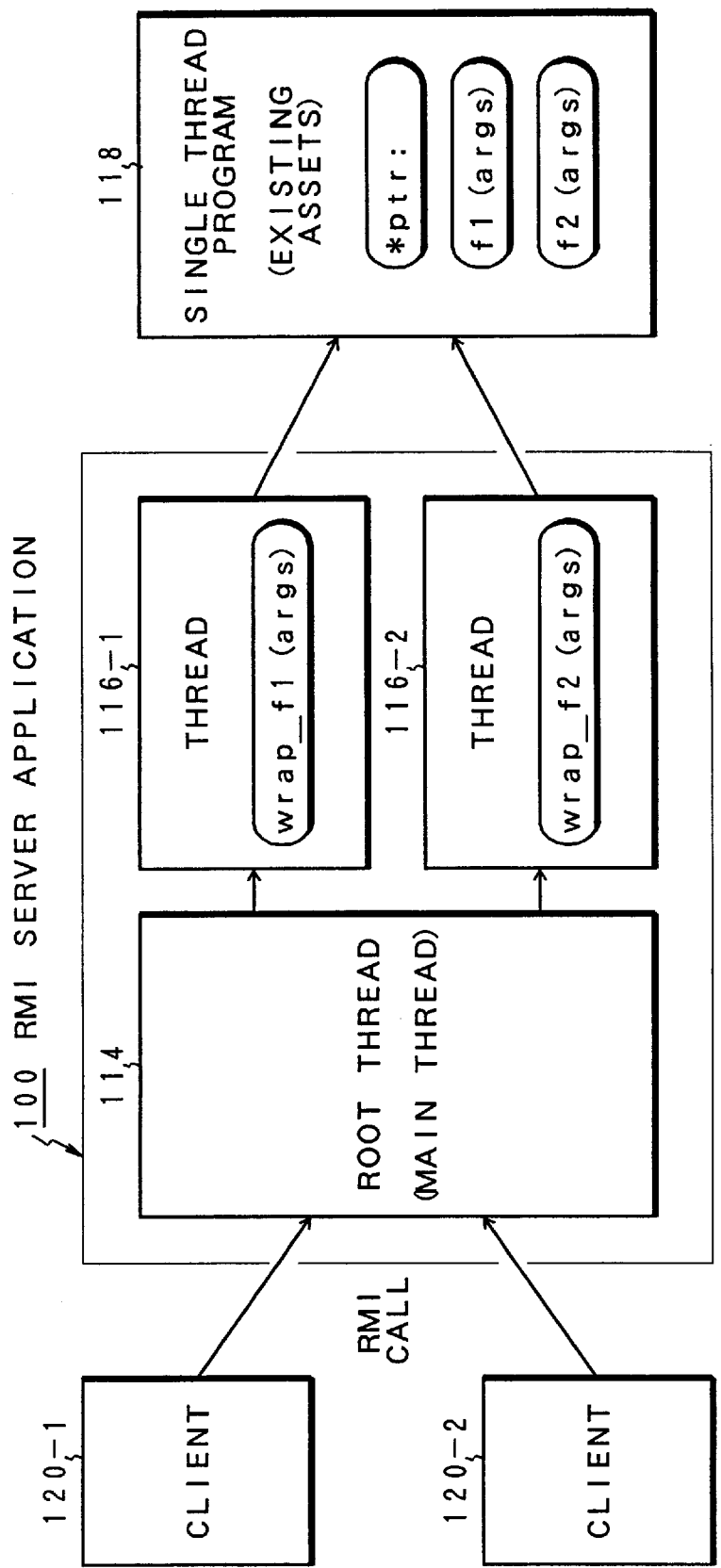
FIG. 1 is a block diagram of a conventional example for executing a multi-thread program of a server application using a remote method invocation (RMI)
Figure 2:
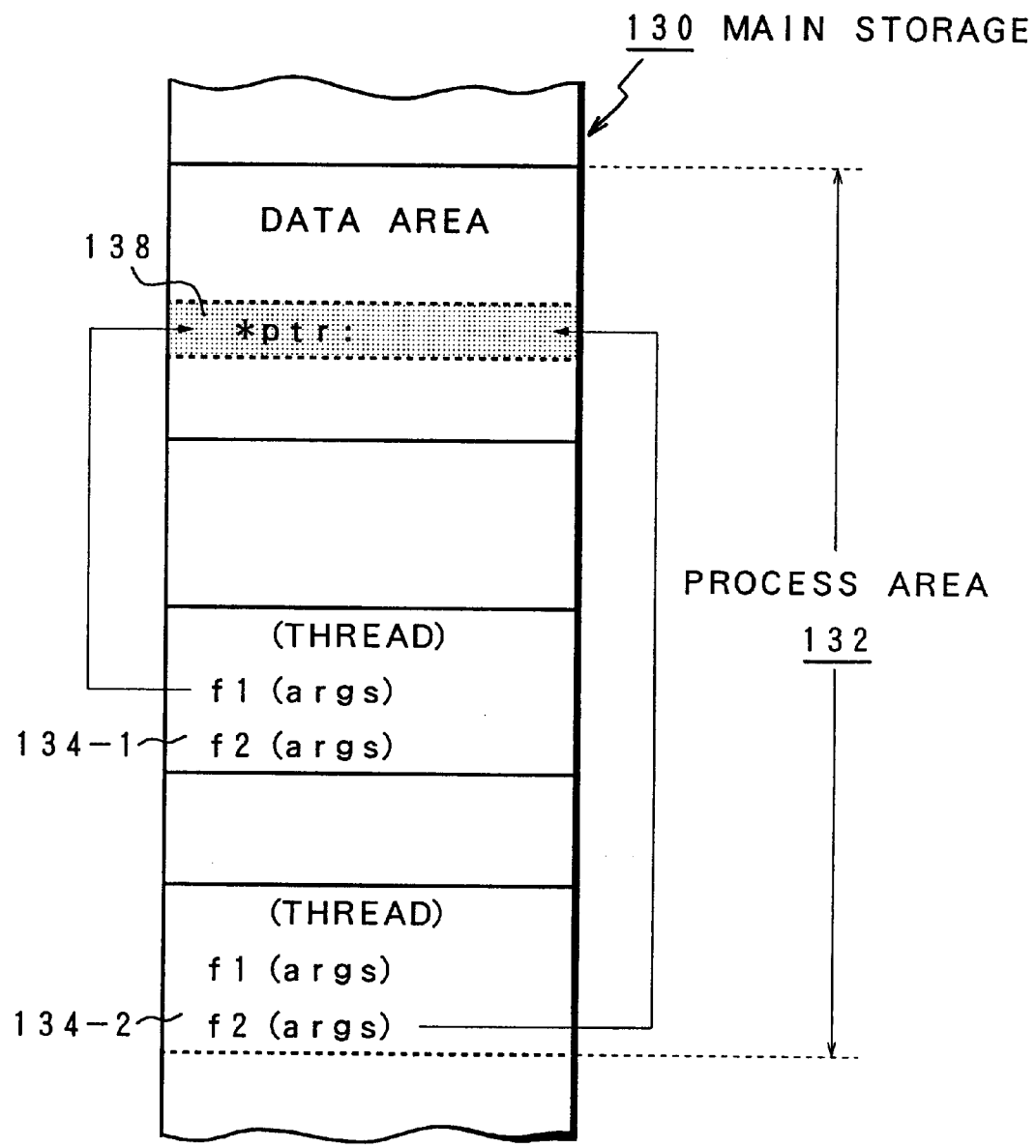
FIG. 2 is an explanatory diagram in cases where two threads of FIG. 1 have made accesses to a static variable of a single thread program.
Figure 3:
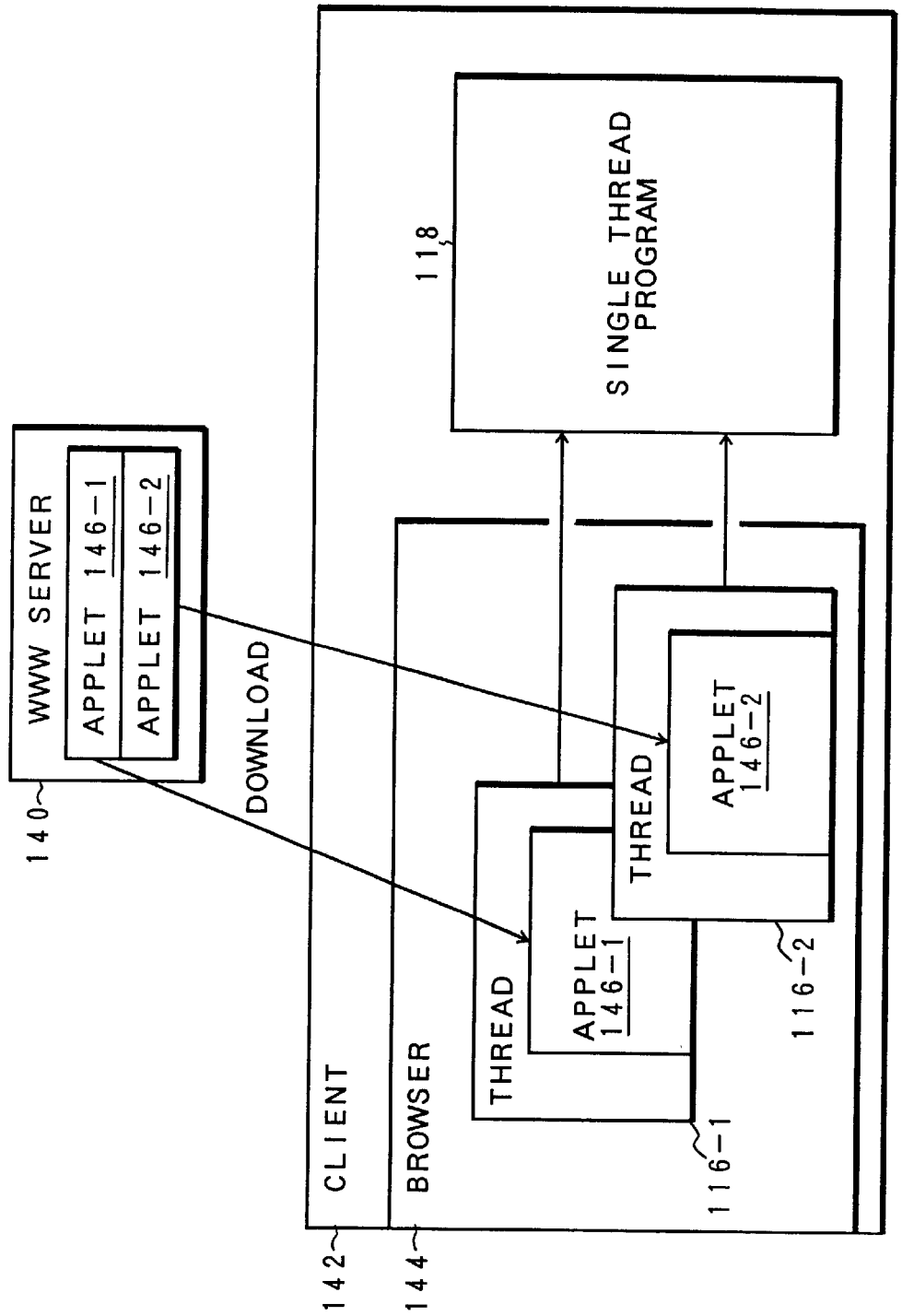
FIG. 3 is a block diagram of a conventional example in which applets downloaded from a server to a browser of a client call the single thread program by use of a dedicated thread.
Figure 5:
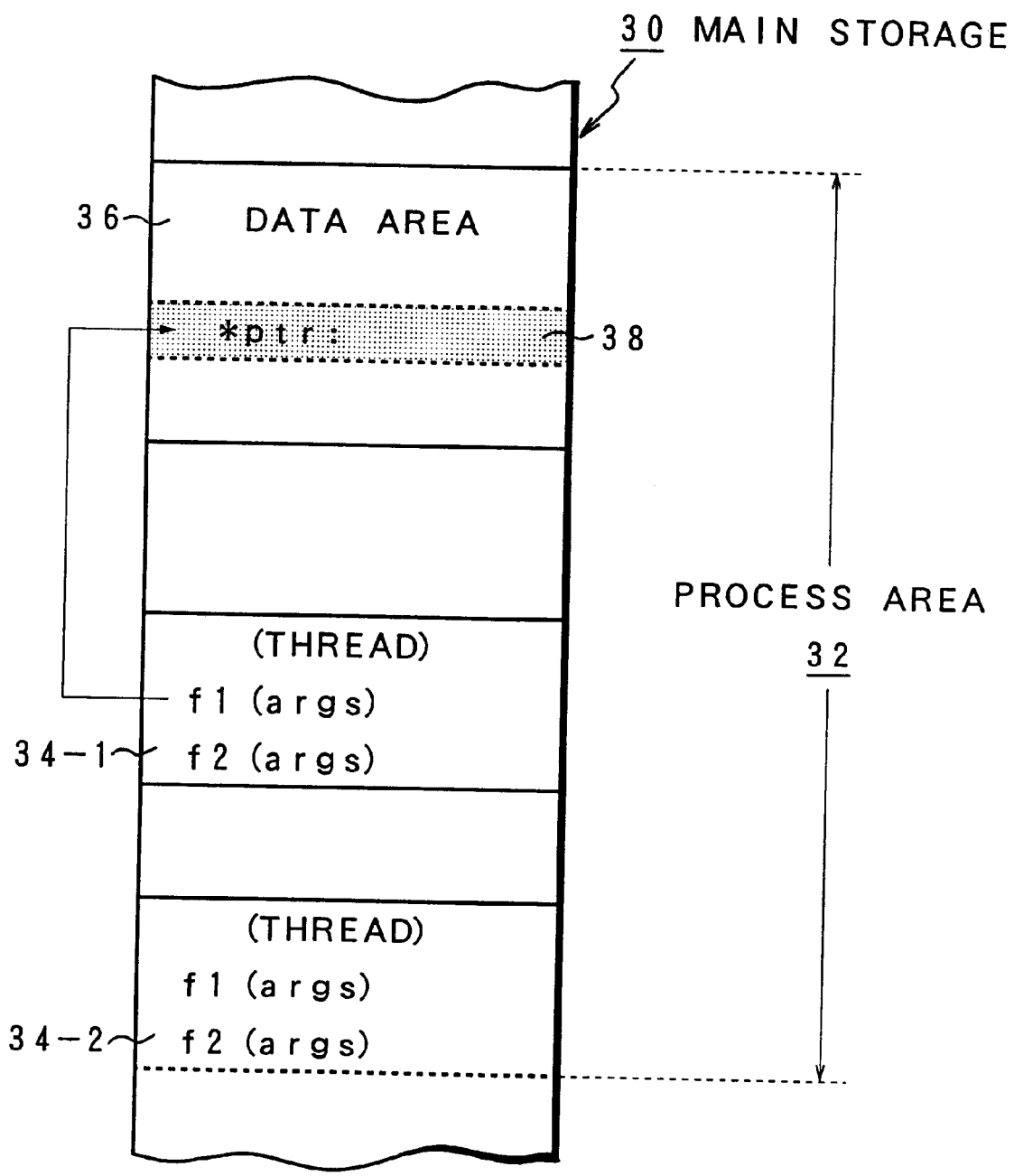
FIG. 5 is an explanatory diagram in cases where an access has been made to a static variable of the single thread program by use of a call only thread of FIG. 4.

FIG. 5 illustrates a process area 32 of a main storage 30 in the case of making an access to the static variable 50 of the single thread program 18 by use of the variables 48-1 and 48-2 of the threads 16-1 and 162. An area 34-1 associated with the thread 16-1 is first secured in the process area 32, a memory area 38 is allocated to a static variable ptr within f1 (args), an access is made to the area allocated to the static variable ptr, and the area 38 is deallocated prior to the return of f1 (args). After the termination of the single thread program 18 based on the call from the thread 16-1 in this manner, the memory area 38 is allocated to the static variable ptr within f2 (args) of an area 34-2 associated with the thread 16-2 through the execution of the single thread program 18 in response to the next call from the thread 16-2, an access is made to the area 38 allocated to the static variable ptr, and the area 38 is deallocated prior to the return of f2 (args). The access is thus made in sequence to the static variable 50 based on the call of the single thread program 18 by the threads 16-1 and 16-2, so that there will by no means occur the conventional problem of competition for the access to the static variable arising from the direct call of the single thread program from the plurality of threads as shown in FIG. 2.

Referring again to FIG. 4, some single thread programs 18 having other processes called by the threads 16-1 and 16-2 may not give rise to any problem in spite of the execution of the multi-thread actions through the calls of a plurality of threads. In the case of the single thread programs posing no problems in spite of the calling by the multi-thread actions in this manner, the call by use of the call only thread 20 may result in a lowered access performance. Thus, in the present invention, it is judged when calling the single thread program 18 by the threads 16-1 and 16-2 whether the single thread program 18 is one causing no problems through the multi-thread actions without any need for the call only thread 20 or one causing any problems through the multi-thread actions with the need for the call only thread 20. Then, in the case of needing the single thread actions, the call is made by use of the call only thread 20, whereas in the case of allowing the multi-thread actions the single thread program 18 is directly called with the call only thread 20 bypassed.

The judgment to see whether the call only thread is required or not for the call of the single thread program 18 by the threads 16-1 and 16-2 in this manner is made by either I. designation by the user, or II. reference to an environment definition table. The designation by the user is carried out when it is previously known that no problems will occur even though the single thread program to be called has been called through the multi-thread. The environment definition table 22 contains information on whether the call only thread 20 is needed or not in addition to identification information on the single thread program 18 to be acted upon, whereby the thread 16-1 can refer to the environment definition table 22 to recognize the single thread program 18 to be called and whether the call only thread 20 is required or not.

Furthermore, in the RMI server application 10 of FIG. 4, the call only thread 20 belongs to a root thread group of the root thread 14 in order to ensure that the call only thread 20 generated when calling the single thread program 18 by the thread 16-1 or 16-2 terminates in synchronism with the root thread 14. This means that the call only thread is generated as the sole thread for calling the single thread program 18 of a different process in one process of the multi-thread program and that in order to implement the function as the sole thread the call only thread 20 has to belong to the same group as one to which the root thread 14 belongs so as to ensure that call only thread 20 terminates upon the termination of the root thread 14, i.e., upon the termination of the main program. In other words, by causing the call only thread 20 to belong to the group of the root thread 14, upon the termination of the root thread 14 the call only thread 20 belonging to the same thread group is posted on that termination whereby the call only thread 20 can correctly terminate in synchronism with the root thread 14. On the contrary, providing that the call only thread 20 terminates in synchronism with the termination of the threads 16-1 and 16-2, it will become difficult to fulfil the function of the present invention that the sole thread can call the single thread program 18 since there exist a plurality of call only threads 20 due to the generation of another call only thread 20 upon the call of a new single thread program 18 after the termination. Thus, the call only thread 20 is caused to belong to the group of the root thread 14 so that it can exist as the sole thread in a process of the multi-thread program by the RMI server application 10.

FIG. 6 is an explanatory diagram of the environment definition table 22 provided in the RMI server application 10 of FIG. 4. The environment definition table 22 comprises a library name 52 for identifying the single thread program 18 which is a method to be acted upon, a method name 54 and a method prototype 56, with the addition of a mode 58 for judging whether the call only thread 20 is required or not. Herein the mode 58 includes a single mode requiring the call only thread 20 and a multi mode being bypassed without requiring the call only thread 20. More specifically, the single mode is used for the case where the single thread program 18 has to be executed in response to the call by the sole thread, whereas the multi mode is used for the case where there occurs no problem even though the single thread program 18 has been called by the parallel actions of a plurality of threads. Information for identifying the single thread program 18 to be acted upon consists of the library name 52, the method name 54 and the method prototype 56. The method prototype 56 represents the type of array of resetting values and arguments, and can be represented by the array of alphabets as shown. The method prototype 56 representable by the alphabetical array in this manner is one used in JNI (Java Native Interface) of Java. That is, JNI allows any prototypes of the method to be represented by character arrays. For example, characters int: 'i' pointer: 'p' structure: 's' can be allocated. The reason why the information for identifying the method to be acted upon, i.e., the single thread program 18 includes the method prototype 56 in addition to the method name 54 is that there exist systems permitting the presence of the methods having the same name but different prototypes in the same library. In the case of creating the environment definition table 22, the user judges from previously given other information whether that method is a multi-thread safe or not and then designates the mode of the environment information table 22. The judgement of whether it is the multi-thread safe is carried out based on, e.g., the result of analysis of the source codes and on the method of the library assuring the actions in the multi-thread. The environment definition table 22 of FIG. 6 is previously referred to before the thread 16-1 or 16-2 of FIG. 4 calls the single thread program 18, whereupon from the mode corresponding to the method name to be called, the single thread program 18 is called by use of the call only thread 20 if the single mode whereas the single thread program 18 is directly called if the multi mode. It is to be noted that the identification information for the environment definition table 22 can include at least the method prototype 56 or the method name 54.

FIG. 7A illustrates the state of storage of the event queue 26 provided in the call only thread 20 of FIG. 4, which serves as an identification information table for the single thread program 18 to be referred to by the call only thread 20. The event queue 26 stores as information for specifying the calling method the library name 52, the method name 54, the method prototype 56 and a resetting value/argument (array) 60. It is further provided with a caller thread ID 62 for specifying a caller thread. The caller thread ID 62 uses the reference (pointer) to the thread in the case of Java. The resetting value/argument (array) 60 has resetting values and values of arguments required for the execution of the single thread program 18. These resetting values and values of arguments are set in the form of an array of objects in Java. The resetting values and values of arguments can take the form of either direct values or the pointers to the structures or the like, although the method prototype 56 is used to judge which element takes the form of direct values and which element takes the form of pointers to the structure or the like. Furthermore, in cases where values have returned to the regions of the resetting values or the arguments as a result of execution of the single thread program 18 executed by the call of the call only thread 20, the values are set in the region of the resetting value/argument (array) 60 and are returned to the thread designated by the caller thread ID to post it on the termination of the multi-thread program 18. The event queue 26 of FIG. 7A represents the case where three synchronous. events 28-1, 28-2 and 28-3 entered by the threads are arrayed from top to bottom in the order of entry thereof. For this reason, the synchronous events 28 entered by the threads 16-1 and 16-2 into the event queue 26 of the call only thread 20 can be information having as one record the library name 52, the method name 54, the method prototype 56, the resetting value/argument (array) 60 and the caller thread ID 62 as can be seen in FIG. 7B in an exclusive manner. Among them, the library name 52, the method name 54 and the method prototype 56 which constitute the information for specifying the calling method are acquired by the reference to the environment definition table 22 of FIG. 6, whereas the resetting value/argument (array) 60 and the caller thread ID 62 are parameters generated by the threads 16-1 and 16-2 themselves attempting to call the single thread program 18. It will be appreciated that the synchronous event 28 has merely to store at least the method name 54 an the caller method name 62.

FIGS. 8A and. 8B illustrate the other state of storage of the synchronous events entered into the event queue 26 of th call only thread 20 of FIG. 4. This embodiment is characterized in that it further includes the information and priorities related to the groups of the method to be acted upon, in addition to the synchronous event of FIGS. 7A and 7B. FIG. 8A depicts the state where four different synchronous events 28-1 to 28-4 are entered into the event queue 26, with the provision of a group 64 and a priority 66 in addition to the library name 52, the method name 54, the method prototype 56, the resetting value/argument (array) 60 and the caller thread ID 62. Herein, among the four synchronous events 28-1 to 28-4 entered in sequence, the second and fourth synchronous events 28-2 and 28-4 belong to the same group UI but have different priorities −1 and +1, respectively. As to the synchronous events 28-2 and 28-4 belonging to the same group 64 but having the different priorities 66 in this manner, at the timing when the synchronous event 28-4 has newly been queued into the lowermost position, comparison is made of the priority due to the presence of the synchronous event 28-2 belonging to the same group, with the result that the synchronous event 28-4 having a higher priority is moved to the second highest position and the synchronous event 28-2 having a lower priority is moved to the fourth position. Thus, in cases where the objects to be called are the methods, i.e., the single thread programs belonging to the same group, the synchronous event having a higher priority is moved to the higher position in the event queue so that control can be provided which allows the event having a higher priority in the same group to have the priority in calling the single thread program for execution.

Figure 9:
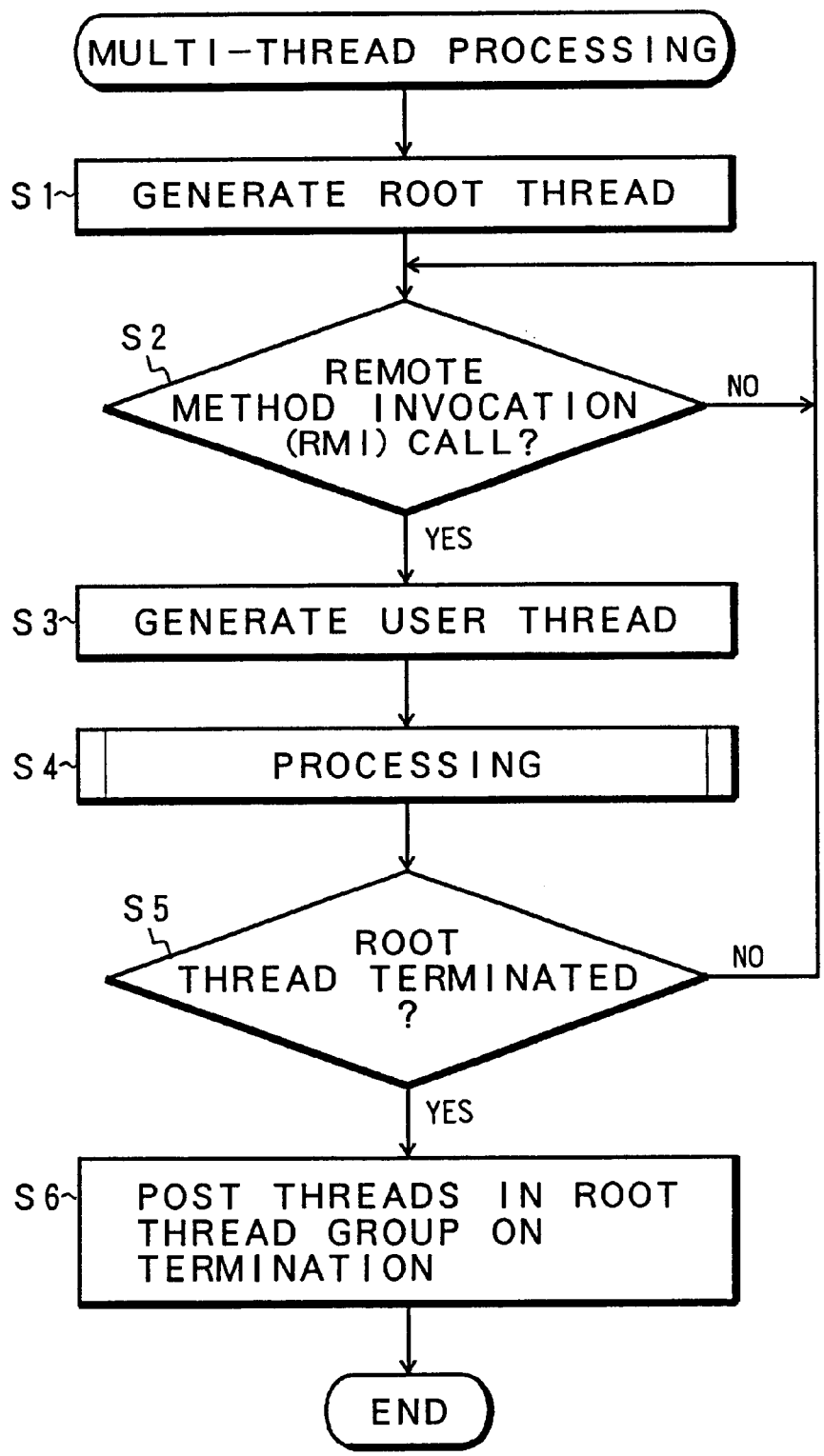
FIG. 9 is a flowchart of multi-thread processing by the server application of FIG. 4.

Referring then to flowcharts of FIGS. 9 to 12, description is made of the multi-thread processing effected by the RMI server application 10 of FIG. 4. FIG. 9 is a flowchart of the entire processing actions of the multi-thread processing effected by the RMI server application 10. When activating a multi-thread program provided in the form of the RMI server application 10, a root thread 14 is generated in step S1. Then in step S2 the root thread 14 is subjected to the method call based on the remote method invocation RMI from the clients 12-1 and 12-2. Upon the acceptance of this method call, a thread 16-1 is generated as a user thread in step S3. Then in step S4, currently generated threads are executed in parallel, and the processings from step S2 are iterated until the completion of the root method in step S5. For this reason, the root thread 14 generates a thread for the execution of the parallel processing every time it accepts a method call based on the RMI from the clients 12-1 and 12-2. When the completion of the root thread is judged in step S5, the procedure goes to step S6 in which the root thread terminates the processing thereof while simultaneously it posts other threads belonging to the root thread group on its termination to terminate the multi-thread processing.

Figure 10B:
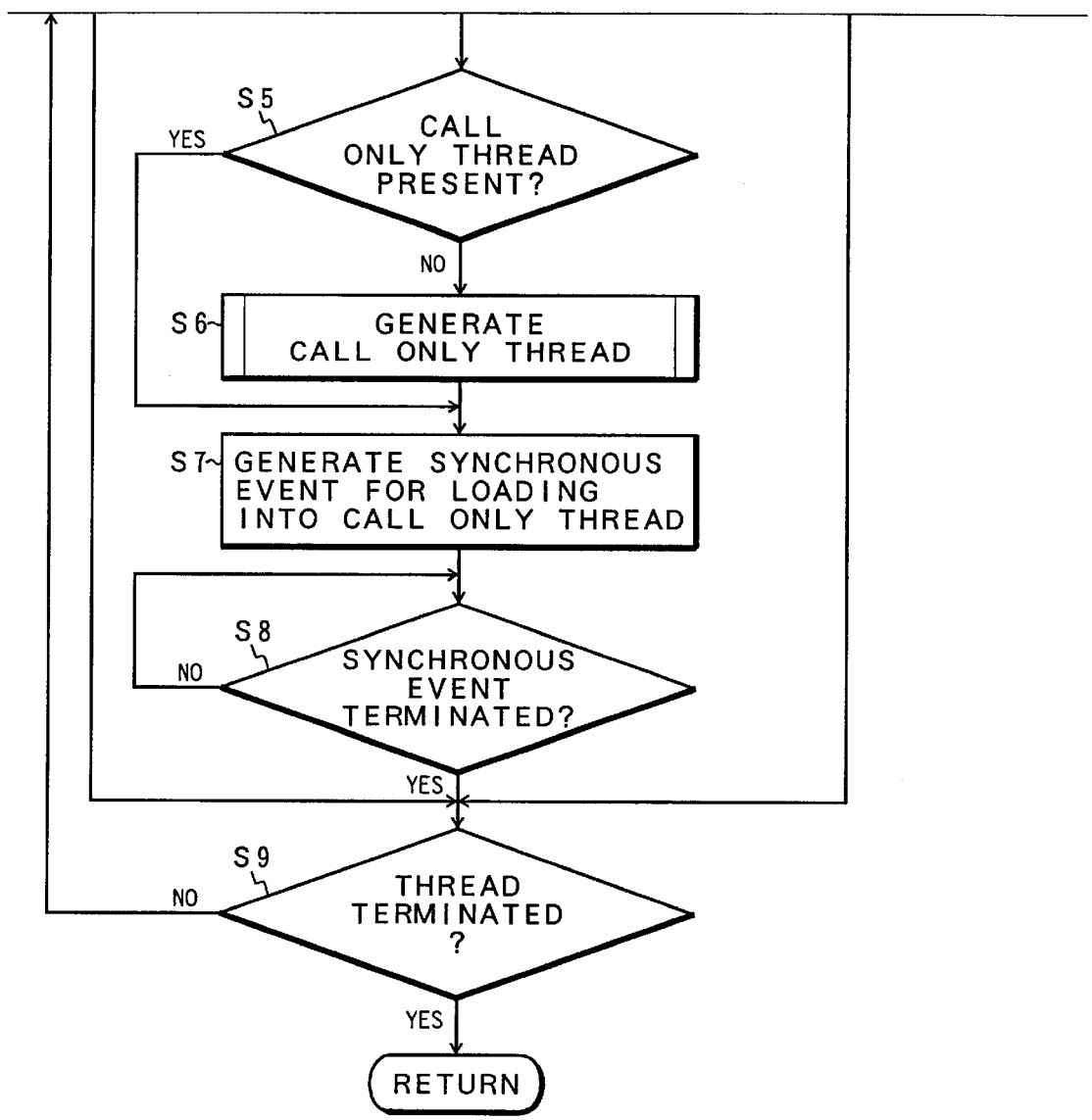

FIGS. 10A and 10B are flowcharts of the generation/execution processing of the user thread generated in step S3 of FIG. 9. First in step S1, the root thread 14 accepts a method call based on the RMI and generates a user thread, e.g., a user thread 16-1. In step S2 a plurality of treads including the thus generated user thread 16-1 are executed in parallel. Then in step S3, a check is made to see if the user thread 16-1 has called and executed the single thread program 18. If the single thread program 18 has been called and executed, then the procedure advances to step S4 in which reference is made to the environment definition table 22 to read the mode from the name of the thread to be acted upon, to thereby see whether the single mode, i.e., the single thread action is required or not. If it has been judged through the reference to the environment definition table 22 that the single thread action, i.e., the call only thread is required, then the procedure goes to step S5 to make a check to see whether the call only thread has already been generated. If the call only thread 20 has not yet been present, then the call only thread 20 is generated in step S6. Then in step S7, the thread 16-1 generates a synchronous event and inserts it into the event queue 26 of the call only thread 20, and then waits for the termination of the synchronous event in step S8. If in step S8 it accepts the termination of the synchronous event together with the resetting of the functions and arguments upon the termination of the execution of the single thread program 18, then the procedure goes to step S9 to make a check to see whether the thread has terminated. If not, then the procedure goes back to step S2 to continue the processing of the thread 16-1. On the other hand, if in step S4 the multi mode has been judged which does not require any single thread actions, i.e., the call only thread as a result of the reference to the environment definition table 22 for the call and execution of the external single thread program 18, the procedure skips to step S10 without performing the processings of step S5 to S8. In the step S10, the external single thread program is called and executed directly without using the call only thread 20, and the post on the termination is waited for in step S11, returning again to the processing of step S2. This user thread generation/execution processing of FIGS. 10A and 10B is executed in parallel as their respective processings of the threads 16-1 and 16-2 shown in FIG. 4.

Figure 11:
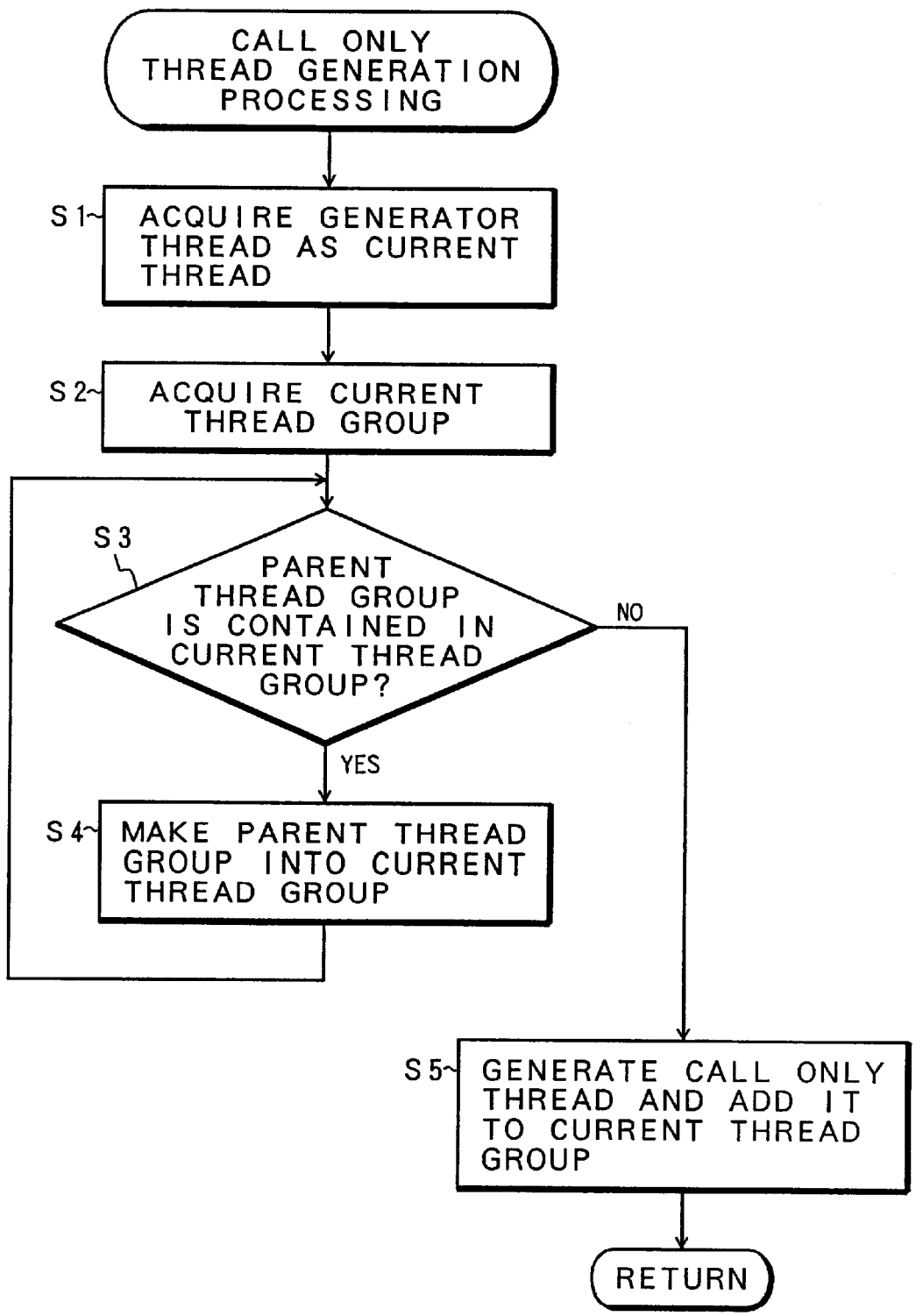
FIG. 11 is a detailed flowchart of call only thread generation processing in FIGS. 10A and 10B.

FIG. 11 is a flowchart of the processing for generating the call only thread 20 effected in step S6 of FIGS. 10A and 10B. In this processing for generating the call only thread 20, a generator thread, e.g., a thread 16-1 first attempting to call the single thread program 18 is acquired as a current thread in step S1 and then a thread group of the current thread 16-1 is acquired in step S2. Then in step S3, a check is made to see if a parent thread group is present in the current thread group. In the case of FIG. 4, the parent thread group of the root thread 14 is present for the thread 16-1, and hence the procedure advances to step S4 to render the parent thread group into the current thread group. Then the procedure returns to the step S3 to make a check to see if any parent thread group is present in the root thread group rendered into the current thread group. Due to the absence of the parent thread group in this case, the procedure goes to step S5 in which a call only thread 20 is generated and the thus generated call only thread is added to the current thread group, that is, the most significant parent thread group, i.e., the root thread group specified in the processings of steps S3 and S4. The call only thread 20 generated by the processing of FIG. 11 can act as the root thread 14.

Figure 12:
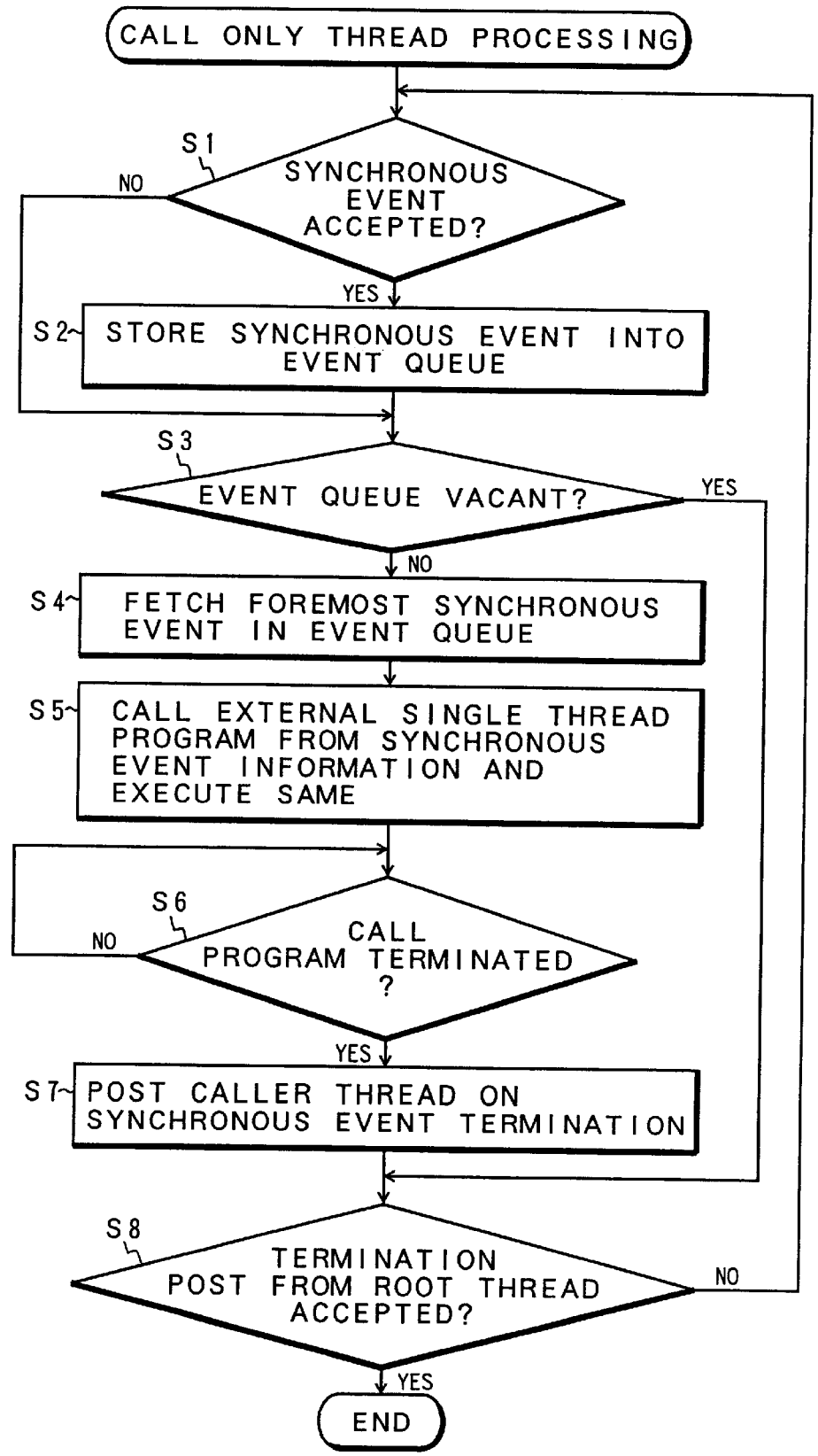
FIG. 12 is a flowchart of processing actions of the call only thread generated in FIGS. 10A and 10B.

FIG. 12 is a flowchart of the processing actions of the call only thread 20 solely generated for calling the-single thread program 18 in FIG. 4. In this processing of the call only thread 20, a check is first made in step S1 to see if a synchronous event for carrying out the call of the single thread program 18 has been accepted from the threads 16-1 and 16-2. When the synchronous event is accepted, it is stored into the event queue 26 in the order of acceptance in step S2. Then in step S3, a check is made to see if the event queue 26 is empty, and if not, the procedure goes to step S4 to fetch the foremost synchronous event in the event queue 26. In step S5, an external single thread program 18 is called for the execution from the information on the synchronous event. Since the termination of the processing of the single thread program 18 results in the resetting of the functions or arguments, the termination of the called program is recognized in step S6 and the caller method is posted on the termination of the synchronous event in step S7. This termination of the synchronous events includes the values of functions or arguments reset by the termination of the single thread program 18. Furthermore, in step S8 a check is made of the post of termination from the root thread. Since the call only thread 20 belongs to the group of the root thread 14 as a result of the generation processing of FIG. 11, the processing of the call only thread 20 is terminated in response to the post of termination from the root thread.

Figure 13:
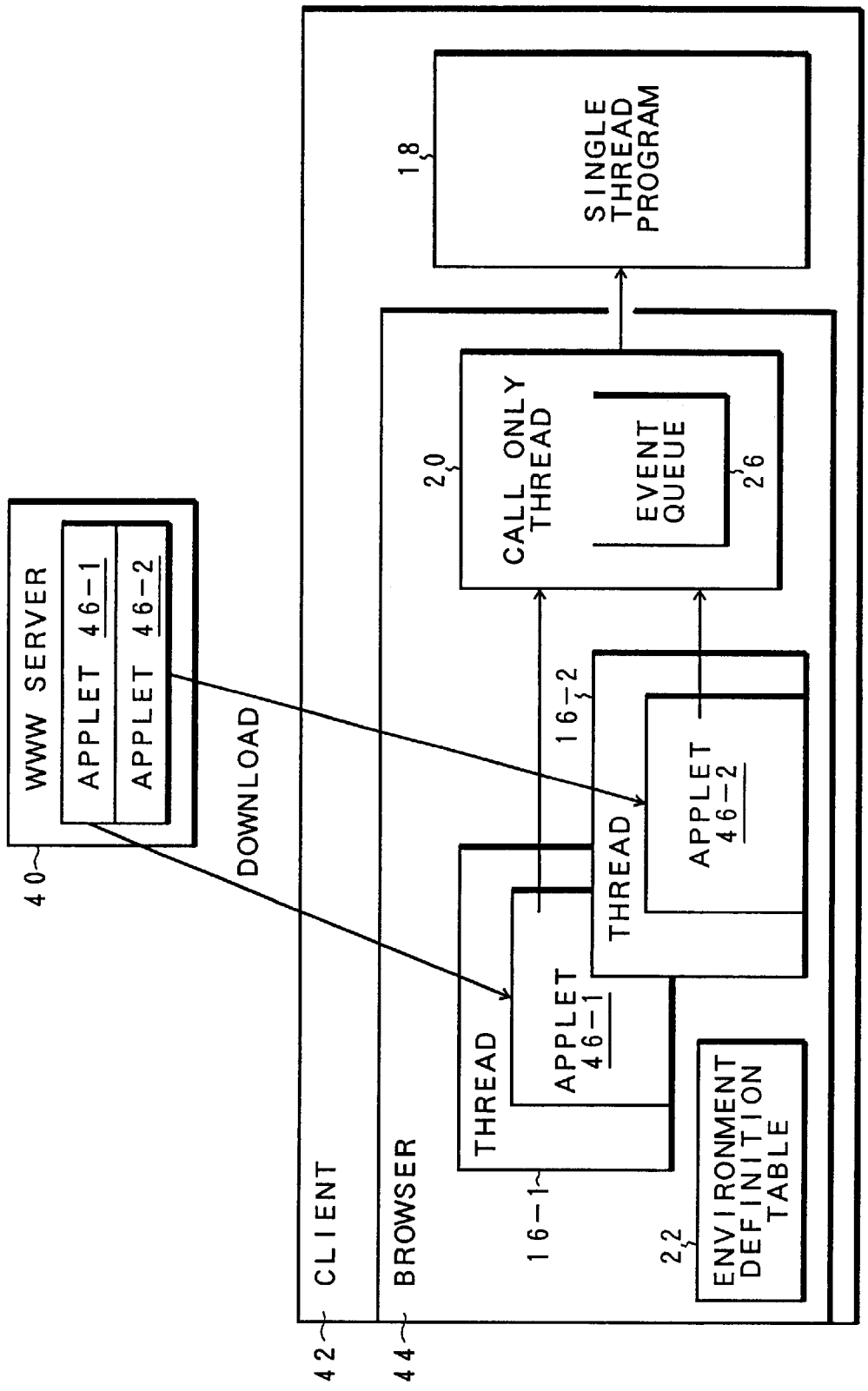
FIG. 13 is a block diagram of an embodiment in which applets downloaded from the server to the browser of the client call the single thread program by use of the call only thread.

FIG. 13 illustrates another embodiment of the multi-thread processing apparatus in accordance with the present invention, in which by way of example, applets downloaded from a server through the threads of the clients invoke a single thread program by use of a call only thread. The client 42 is provided with a browser 44 so that threads 16-1 and 16-2 are generated in response to a method call. The threads 16-1 and 16-2 make an access to a WWW server 40 to download the applets 46-1 and 46-2, respectively, for the parallel execution. In cases where two or more applets 46-1 and 46-2 are being executed on the browser 44 in this manner, each of the applets 46-1 and 46-2 may possibly call the same single thread program 18. In such a case, the present invention allows the applet 46-1 first calling the single tread program 18 to generate a call only thread 20 and to generate a synchronous event for calling the single thread program 18, for the entry into the event queue 26. The call only thread 20 fetches the synchronous event from the event queue 26 and executes the single thread program 18 on the basis of that synchronous event. After the completion of the execution, the call only thread 20 fetches the next synchronous event from the event queue 26 to execute the single thread program 18. For this reason, even though the applets 46-1 and 46-2 have called the same single thread program 18, that single thread program 18 is executed in the order of call of the applets 46-1 and 46-2 so that competitive accesses to the same single thread program 18 can not be made by a plurality of applets. In this case as well, the environment definition table 22 is referred to when the applet 46-1 calls the single thread program 18, with the result that if the mode 52 is the single mode as in FIG. 6, the call of the single thread program 18 is carried out using the call only thread 20, whereas if.multi mode, the single thread program 18 is directly called for execution without using the call only thread 20, that is, by bypassing the call only thread 20. It will be appreciated that the contents of the event queue 26 provided in the call only thread 20 are applicable to both the case of having no priorities with the FIG. 7 group and the case of having the priorities with.the FIG. 6 group.

Figure 14:
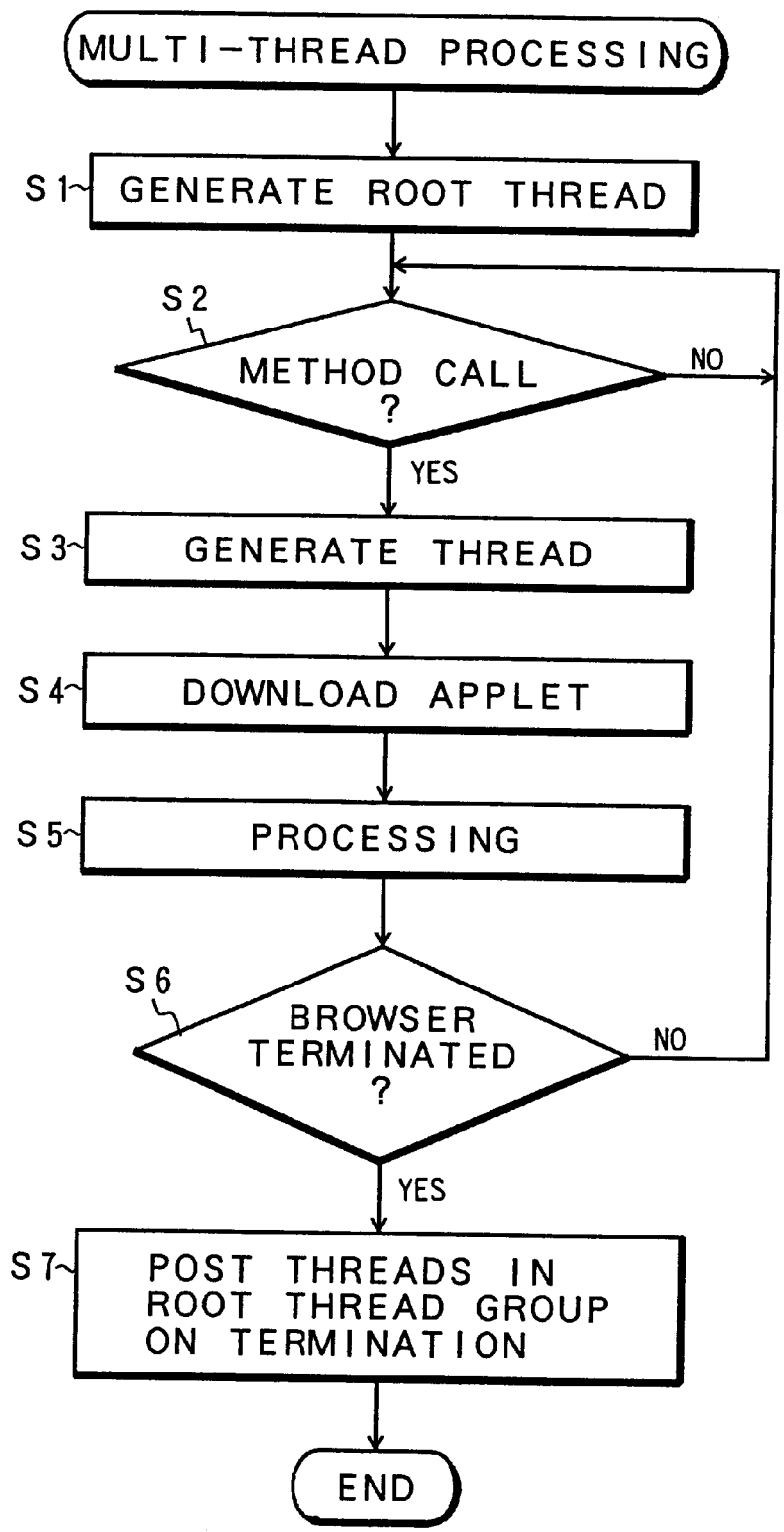
FIG. 14 is a flowchart of multi-thread processing effected by the browser of FIG. 13.

FIG. 14 is a flowchart of the entire processing actions of the multi-thread processing effected in the browser 44 of FIG. 13. When the browser 44 of.the client 42 is activated, a root thread not shown is generated in step S1. If in this state a method call is judged in step S2, the root thread generates threads 161 and 16-2 for each call for example in step S3. The thus generated threads 16-1 and 16-2 make accesses to the WWW server 40 to download the applets 46-1 and 46-2, respectively, in step S4. Then the plurality of applets 46-1 and 46-2 are executed in parallel on the browser 44 as in step S5. In such a parallel execution of the applets 46-1 and 46-2, a call may possibly be made of the single thread program 18 as a dynamic library. In such a case, the call only thread 20 is generated so that synchronous events are entered into its event queue 26, and the single thread program 18 is carried out in the order of requests for calling of the applets 46-1 and 46-2 through the fetch of the synchronous event from the event queue 26 on the first-in first-out (FIFO) basis. Then, in step S6 a check is made of termination of the browser 44. If the browser 44 has terminated, then in step S7 the threads of the root thread group are posted on the termination to complete a series of processing. This root thread group includes the call only thread 20 solely existing in the browser 44, the call only thread 20 terminating in synchronism with the termination of the browser. The applet generation/execution processing in this case is the same as the user thread generation/execution processing of FIGS. 10A and 10B except for the download from the WWW browser, the call only thread generation processing by use of the applets is the same as one shown in the flowchart of FIG. 9, and the single thread program call processing by use of the call only thread generated is the same as one shown in the flowchart of FIG. 12.

The present invention further provides a computer readable record medium on which a multi-thread program is stored. Preferred embodiments of this record medium can include a removable portable record medium such as a CD-ROM or a floppy disk, a storage device of a program provider who provides a program via lines, and a memory device such as a RAM or a hard disk of a processor in which the program has been installed. The multi-thread processing program provided by the record medium is loaded into the processing apparatus and is run on its main memory.

According to the present invention, as set forth hereinabove, there no need to generate any other processes when calling a single thread program from a multi-thread program, thereby making it possible to reduce the burden of processing and to improve the execution performances.

Furthermore, in the present invention, there is no need to remake the single thread program into the multi-thread program when calling the single thread program from the multi-thread program, thereby making it possible to improve the efficiency in the development of programs.

Furthermore, the present invention ensures that the sole call only thread for calling the single thread program belongs to the same thread group as one to which the root thread (main thread) belongs, so as to assure the termination of the call only thread upon the termination of the main program, thereby preventing a plurality of call only threads to lie within the process of the multi program, as well as allowing the presence of the sole call only thread to enable all accesses to the single thread program 18 to be made by the single thread actions.

Furthermore, the present invention allows the presence of programs giving rise to no problems in spite of the multi-thread actions to lie within the single thread program, so that by judging whether the call only thread is required or not and, if not, by directly calling the single thread program with the call only thread bypassed, it is possible to improve the execution performances in the case of calling single thread programs free from any problems through the call based on the multi-thread action.

Although the embodiment of FIG. 4 has employed by way of example the distributed executions based on the remote method invocation (RMI) which is a technique inherent to the Java standard, the procedure of the present invention for generating and calling the call only thread 20 is applicable intactly to a sort of CORBA (Common Object Request Broker Architecture) distributed executions employing CORBA, in which the multi-thread program may call the single thread program 18 of the other process.

It will be appreciated that the present invention is not intended to be limited to the above embodiments but covers all any appropriate variants without impairing its objects and advantages. In addition, the present invention is not restricted by the numerical values indicated in the above embodiments.

What is claimed is:

1. A multi-thread processing apparatus comprising:
 a multi-thread program capable of executing a plurality of threads in parallel and capable of calling and running a single thread program; and
 a sole call only thread for calling said single thread program, said call only thread being generated when first calling said single thread program from one specific thread of said multi-thread program and running said single thread program called;

wherein said call only thread belongs to a group of a most significant thread (root thread or main thread) generated by said multi-thread program, to thereby terminate in synchronism with the termination of said most significant thread.

2. A multi-thread processing apparatus according to claim 1, wherein said call only thread calls said single thread program in the order of call from a plurality of threads generated by said multi-thread program.

3. A multi-thread processing apparatus according to claim 2, wherein said call only thread is provided with an event queue having a first-in first-out (FIFO) configuration, for storing synchronous events entered therein as requests for call from said threads of said multi-thread program, said call only thread fetching said synchronous events in order from said event queue to run said single thread programs.

4. A multi-thread processing apparatus according to claim 1, wherein a synchronous event entered into an event queue of said call only thread is in the form of a record in which at least a method name and a caller thread ID are stored as information for specifying a single thread program to be called.

5. A multi-thread processing apparatus according to claim 1, wherein said thread of said multi-thread program judges whether said call only thread is needed or not when calling said single thread program, said thread, if needed, making a call by use of said call only thread, said thread, if not, making a direct call of said single thread program.

6. A multi-thread processing apparatus according to claim 5, wherein said thread of said multi-thread program judges whether said call only thread is needed or not, on the basis of a designation by the user or of an environment definition table in which the presence or absence of need for said call only thread is described in a manner corresponding to the method prototype or method of said single method program.

7. A multi-thread processing method for calling a single thread program from a multi-thread program capable of executing a plurality of threads in parallel and for running said single thread program called, said method comprising the steps of:

generating a sole call only thread for calling said single thread program when first calling said single thread program from one specific thread of said multi-thread program and running said single thread program called; and after generation, calling said single thread program by use of said call only thread;

wherein said call only thread belongs to a group of a most significant thread (root thread or main thread) generated by said multi-thread program, to thereby terminate in synchronism with the termination of said most significant thread.

8. A computer readable record medium on which is stored a multi-thread processing program for calling a single thread from a multi-thread program capable of executing a plurality of threads in parallel and for executing said single thread called, wherein said multi-thread processing program stores therein a sole call only thread for calling said single thread program, said call only thread being generated when first calling said single thread program from one specific thread of said multi-thread program and running said single thread program called;

wherein said call only thread belongs to a group of a most significant thread (root thread or main thread) generated by said multi-thread program, to thereby terminate in synchronism with the termination of said most significant thread.

* * * * *